US010715497B1

(12) United States Patent
Maeng

(10) Patent No.: US 10,715,497 B1
(45) Date of Patent: Jul. 14, 2020

(54) DIGITAL SAFETY BOX FOR SECURE COMMUNICATION BETWEEN COMPUTING DEVICES

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 215 days.

(21) Appl. No.: 15/431,290

(22) Filed: Feb. 13, 2017

(51) Int. Cl.
*H04L 29/06* (2006.01)
*H04L 9/08* (2006.01)

(52) U.S. Cl.
CPC ........ *H04L 63/0428* (2013.01); *H04L 9/0825* (2013.01); *H04L 63/0442* (2013.01); *H04L 63/123* (2013.01); *H04L 63/126* (2013.01)

(58) Field of Classification Search
CPC ............... H04L 63/0428; H04L 9/0825; H04L 63/0442; H04L 63/123; H04L 63/126
See application file for complete search history.

(56) References Cited

U.S. PATENT DOCUMENTS

| 6,226,618 | B1 | 5/2001 | Downs et al. |
| 6,449,367 | B2 | 9/2002 | Van Wie et al. |
| 7,203,844 | B1* | 4/2007 | Oxford ................... G06F 21/10 380/269 |
| 8,327,450 | B2 | 12/2012 | Clement et al. |
| 8,416,954 | B1* | 4/2013 | Raizen ................ H04L 63/0428 380/277 |
| 8,478,995 | B2 | 7/2013 | Klculumbre |
| 8,499,156 | B2 | 7/2013 | Wong et al. |
| 10,075,300 | B1* | 9/2018 | Maeng ................... H04L 9/3236 |
| 2006/0005017 | A1* | 1/2006 | Black ................... H04L 63/0428 713/165 |
| 2006/0085343 | A1* | 4/2006 | Lisanke ................... G06F 21/10 705/50 |
| 2007/0198432 | A1* | 8/2007 | Pitroda ................... G06Q 20/02 705/64 |
| 2009/0196421 | A1 | 8/2009 | Okuda |
| 2012/0072837 | A1 | 3/2012 | Triola |

(Continued)

OTHER PUBLICATIONS

U.S. Appl. No. 15/382,116, filed Dec. 16, 2016, by Maeng et al.

*Primary Examiner* — Yonas A Bayou
(74) *Attorney, Agent, or Firm* — Shumaker & Sieffert P.A.

(57) ABSTRACT

Techniques are described for generating and executing a digital safety box to provide secure communication between two computing devices. The digital safety box comprises an encryption key, and an executable code that defines a content holder and performs encryption of content stored in the content holder with the encryption key for secure communication. A receiver computing device generates the digital safety box including the executable code and the encryption key for a requesting sender computing device. The digital safety box may be one-time use and include a unique encryption key and a unique executable code. Upon receiving the digital safety box, the sender computing device executes the executable code of the digital safety box as an application that enables the sender computing device to store content in the defined content holder, encrypt the data with the encryption key, and generate a sealed digital safety box including the encrypted content.

28 Claims, 5 Drawing Sheets

(56) References Cited

U.S. PATENT DOCUMENTS

| | | | |
|---|---|---|---|
| 2012/0204032 A1* | 8/2012 | Wilkins | H04L 9/006 |
| | | | 713/170 |
| 2013/0198083 A1 | 8/2013 | Moskowitz | |
| 2016/0028550 A1* | 1/2016 | Gaddam | H04L 9/3263 |
| | | | 713/173 |
| 2016/0065372 A1* | 3/2016 | Kolesnikov | H04L 63/0428 |
| | | | 713/168 |
| 2016/0285635 A1* | 9/2016 | Kolesnikov | H04L 9/3226 |
| 2018/0123790 A1* | 5/2018 | Itamar | G06F 21/6227 |
| 2018/0123794 A1* | 5/2018 | Goranov | H04L 9/30 |
| 2018/0144341 A1* | 5/2018 | Karkkainen | G06Q 20/02 |

* cited by examiner

DIGITAL SAFETY BOX FOR SECURE COMMUNICATION BETWEEN COMPUTING DEVICES

TECHNICAL FIELD

The disclosure relates to secure communication between computing devices.

BACKGROUND

Secure communications over a public computer network, e.g., the Internet, may be performed using encryption keys to provide confidential communications and digital certificates to verify identifies of the sending and/or receiving parties. For example, the Hypertext Transfer Protocol Secure (HTTPS) protocol provides authentication of a web site or associated web server with which a user is communicating by verifying the web server's digital certificate. A digital certificate, which is issued by a certificate authority, certifies ownership of a public key by a named subject of the certificate, e.g., a web server, and a user's web browser may rely upon the certificate to verify the identity of the web server. The HTTPS protocol also provides bidirectional encryption of communications between the user's web browser and the web server. The user's web browser may use the public key of the web server to encrypt communication that can only be decrypted and read with the private key, which may be held by a service provider that owns the web server.

In the above example, third party systems, e.g., web browsers, service providers, and certificate authorities, are needed to generate, store, and/or apply the digital certificates and encryption keys used to provide ongoing communication security. In order to provide temporary communication security directly between two computing devices, the two computing devices typically need to agree on a common method to be used for secure communication. For example, the two computing devices may need to agree upon a temporary shared symmetric encryption key to be used by each of the computing devices to encrypt communications. The two computing may be any of a wide range of devices, including laptop or desktop computers, tablet computers, so-called "smart" phones, "smart" pads, "smart" watches, or other personal digital appliances equipped for wired or wireless communication.

SUMMARY

In general, this disclosure describes techniques for generating and executing a digital safety box to provide secure communication between two computing devices. The digital safety box comprises an encryption key, and an executable code that defines a content holder and performs encryption of content stored in the content holder with the encryption key for secure communication. According to the disclosed techniques, a receiver computing device generates the digital safety box including the executable code and the encryption key for a requesting sender computing device. The digital safety box may be one-time use and include a unique encryption key and a unique executable code. Upon receiving the digital safety box, the sender computing device executes the executable code of the digital safety box as an application or "app" that enables the sender computing device to store content in the defined content holder, encrypt the data with the encryption key, and generate a sealed digital safety box including the encrypted content. In this way, the digital safety box described in this disclosure may provide temporary communication security directly between two computing devices.

In one example, this disclosure is directed to a method for secure communication, the method comprising receiving, by a receiver computing device and from a sender computing device, a request for a digital safety box; generating, by the receiver computing device, the digital safety box for the sender computing device, wherein the digital safety box includes an encryption key and an executable code that defines a content holder; sending, by the receiver computing device and to the sender computing device, the digital safety box; receiving, by the receiver computing device and from the sender computing device, a sealed digital safety box including content in the content holder encrypted with the encryption key; and decrypting, by the receiver computing device, the content in the content holder of the sealed digital safety box.

In another example, this disclosure is directed to a receiver computing device comprising a memory, and one or more processors in communication with the memory. The one or more processors are configured to receive, from a sender computing device, a request for a digital safety box; generate the digital safety box for the sender computing device, wherein the digital safety box includes an encryption key and an executable code that defines a content holder; send, to the sender computing device, the digital safety box; receive, from the sender computing device, a sealed digital safety box including content in the content holder encrypted with the encryption key; and decrypt the content in the content holder of the sealed digital safety box.

In a further example, this disclosure is directed to a method for secure communication, the method comprising sending, by a sender computing device and to a receiver computing device, a request for a digital safety box; receiving, by the sender computing device and from the receiver computing device, the digital safety box including an encryption key and an executable code that defines a content holder; executing, by the sender computing device, the executable code of the digital safety box, wherein executing the executable code includes storing content in the content holder, encrypting the content in the content holder with the encryption key, and generating a sealed digital safety box including the encrypted content; and sending, by the sender computing device and to the receiver computing device, the sealed digital safety box.

In an additional example this disclosure is directed to a sender computing device comprising a memory, and one or more processors in communication with the memory. The one or more processors are configured to send, to a receiver computing device, a request for a digital safety box; receive, from the receiver computing device, the digital safety box including an encryption key and an executable code that defines a content holder; execute the executable code of the digital safety box, wherein the executable code causes the one or more processors to store content in the content holder, encrypt the content in the content holder with the encryption key, and generate a sealed digital safety box including the encrypted content; and send, to the receiver computing device, the sealed digital safety box.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
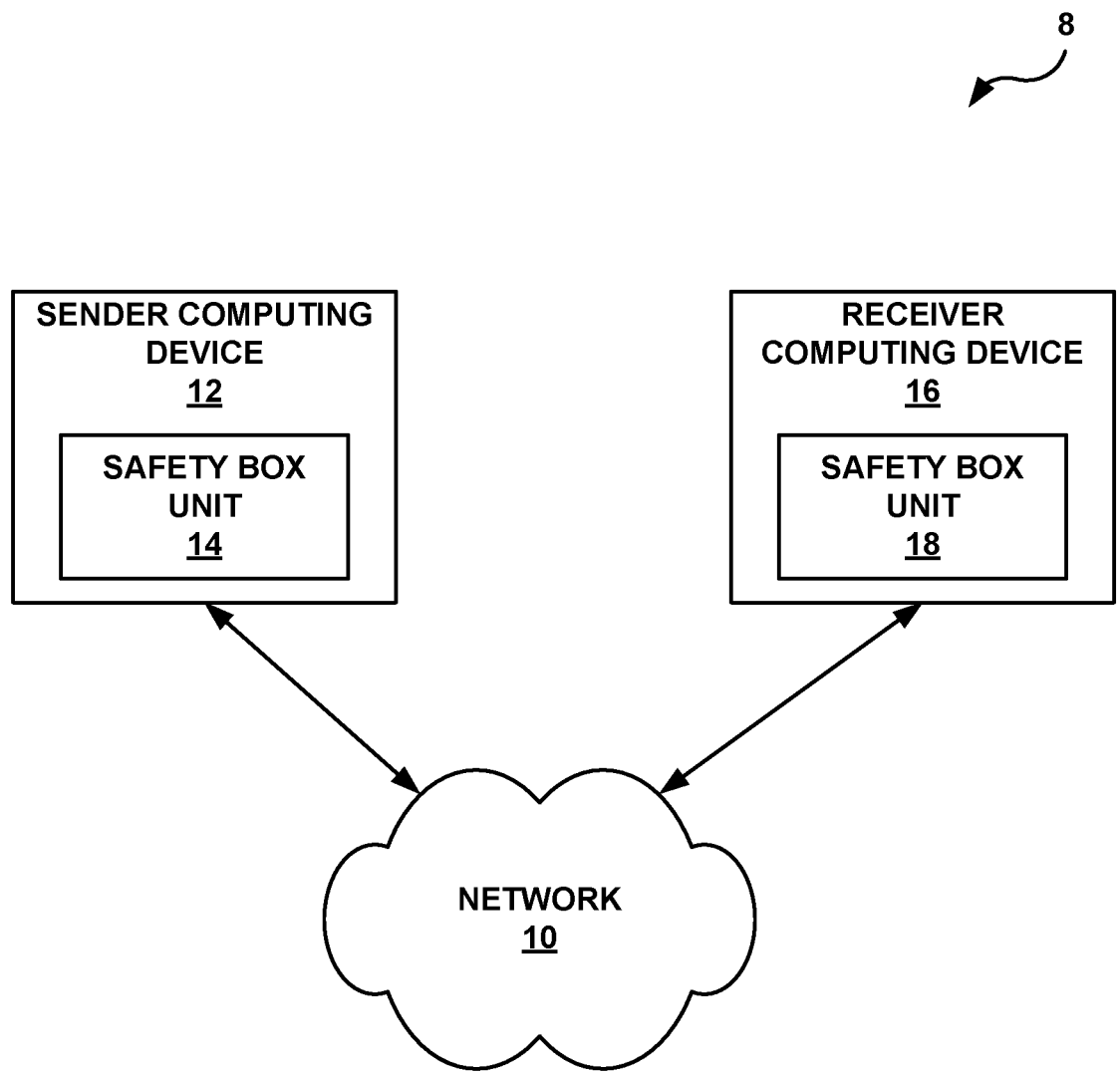
FIG. 1 is a block diagram illustrating an example network system including a sender computing device and a receiver computing device configured to perform secure communication using a digital safety box, in accordance with the techniques of this disclosure.

FIG. 1 is a block diagram illustrating an example network system 8 including a sender computing device 12 and a receiver computing device 16 configured to perform secure communication using a digital safety box, in accordance with the techniques of this disclosure. The disclosed techniques may be used to provide temporary communication security directly between sender computing device 12 and receiver computing device 16.

As illustrated in FIG. 1, network system 8 includes sender computing device 12 that is in communication with receiver computing device 16 via a network 10. In some examples, network 10 may comprise a private network associated with one or sender computing device 12 or receiver computing device 16. In other examples, network 10 may comprise a public network, such as the Internet. Although illustrated as a single entity, network 10 may comprise a combination of public and/or private networks. In some examples, network 10 may comprise one or more of a wide area network (WAN) (e.g., the Internet), a local area network (LAN), a virtual private network (VPN), or another wired or wireless communication network.

In one example, the disclosed digital safety box may be used for secure communication between two user devices such that two friends, family members, or colleagues may securely exchange data such as documents, money or other digital currency, or other confidential information. In this example, sender computing device 12 and receiver computing device 16 may each comprise any of a wide range of user devices, including laptop or desktop computers, tablet computers, so-called "smart" phones, "smart" pads, or other personal digital appliances equipped for wired or wireless communication.

In another example, the disclosed digital safety box may be used for secure communication between a user device and an enterprise computing device such that a user may securely exchange documents, money or other digital currency, or other confidential information with a financial institution, law firm, or other enterprise. In this example, sender computing device 12 may comprise a user device and receiver computing device 16 may comprise one or more computing devices within an enterprise, such as laptop or desktop computers, workstations, wireless devices, network-ready appliances, file servers, print servers, or other devices included in a centralized or distributed system of computing devices for the enterprise.

Sender computing device 12 may include at least one user interface device (not shown) that enables a user to interact with sender computing device 12. In some examples, the user interface device of sender computing device 12 may be configured to receive tactile, audio, or visual input. In addition to receiving input from the user, the user interface device of sender computing device 12 may be configured to output content such as a graphical user interface (GUI) for display, e.g., at a display device associated with sender computing device 12. In some examples, receiver computing device 16 may also include at least one user interface device that enables a user to interact with receiver computing device 16.

In a scenario in which a user device is communicating with a website or web server over a public computer network, e.g., the Internet, communication security may be established between the user's web browser and the web server. For example, the Hypertext Transfer Protocol Secure (HTTPS) protocol for secure communication provides authentication of the website or web server with which the user device is communicating by verifying the web server's digital certificate. The digital certificate is issued by a certificate authority and certifies ownership of a public encryption key, including information about the public key and the identity of the owner of the public key, e.g., the web server. The user's web browser may rely upon the digital certificate to verify the identity of the web server. The HTTPS protocol also provides bidirectional encryption of communications between the user's web browser and the web server. The user's web browser may use the web server's public key included in the digital certificate to encrypt communication that can only be decrypted and read with a paired private encryption key, which may be held by the web server or a service provider that owns the web server. The HTTPS protocol may prevent man-in-the-middle attacks, e.g., eavesdropping or snooping, on communications between the user's web browser and the web server because the communications are encrypted using an asymmetric public and private encryption key pair.

In a scenario in which a user device is in direct communication with another user device or an enterprise device over a public computer network, e.g., the Internet, communication security may be established between the two computing devices based on a mutually-agreed upon method for secure communication. For example, the two computing devices may agree upon a temporary shared symmetric encryption key to be used by each of the computing devices to encrypt communications. In this scenario, the symmetric encryption key is first shared between the two computing devices in an unsecured communication that is susceptible to snooping or exposure. Fraudsters may then perform man-in-the-middle attacks on the subsequent communications between the two computing devices using the snooped symmetric encryption key to decrypt confidential messages and/or re-encrypt corrupted messages.

In some examples, user devices themselves are not capable of encrypting messages with a public key of an asymmetric public and private encryption key pair. For example, a user device may not have the software, application, or other means needed to perform encryption with the public key. As another example, a user device may not be able to verify the owner of the public key that would be capable of decrypting any encrypted messages.

According to the techniques described in this disclosure, sender computing device 12 and a receiver computing device 16 are configured to perform temporary secure communication using a digital safety box. The digital safety box may enable temporary secure communication directly between computing devices 12, 16 without the need for a trusted third party to manage digital certificates and encryption keys for ongoing communication security between a user and a website or web server. The digital safety box may be used for ad hoc or planned transactions. For enhanced security, the digital safety box may be one-time use or limited-time use. In the example illustrated in FIG. 1, sender computing device 12 includes a safety box unit 14 and receiver computing device 16 includes a safety box unit 18. Safety box units 16, 18 may each comprise an application or "app" that is executed by one or more processors of the respective computing device 12, 16.

In accordance with the disclosed techniques, safety box unit 18 of receiver computing device 16 generates a digital safety box that includes an encryption key and an executable code, and sends the digital safety box to sender computing device 12 via network 10. The executable code of the digital safety box may be generated to run on sender computing device 12 based on the system capabilities, e.g., operating system and supported executable file formats, of sender computing device 12. In some examples, the encryption key included in the digital safety box may be a public key of a public and private encryption key pair.

Upon receipt of the digital safety box, sender computing device 12 executes the executable code of the digital safety box as safety box unit 14. Safety box unit 14 of sender computing device 12 presents a content holder defined by the executable code of the digital safety box to a user of sender computing device 12 to receive content to be securely communicated. Safety box unit 14 of sender computing device 12 then performs encryption of the content stored in the content holder with the encryption key included in the digital safety box. The executable code of the digital safety box, therefore, provides sender computing device 12 with the means to encrypt content with the encryption key for secure communication. Safety box unit 14 of sender computing device 12 generates a sealed digital safety box that includes the encrypted content, and sends the sealed digital safety box back to receiver computing device 16 via network 10. In some examples, the sealed digital safety box may have a data structure that is defined by the executable code of the digital safety box.

Upon receipt of the sealed digital safety box, safety box unit 18 of receiver computing device 16 opens the sealed digital safety box and decrypts the content. In some examples, the data structure of the sealed digital safety box may only be understood by receiver computing device 16 such that safety box unit 18 performs a first "decryption" step by recognizing the encrypted content within the data structure of the sealed digital safety box. Safety box unit 18 may then perform a second "decryption" step by decrypting the encrypted content with a decryption key, e.g., the private key of the public and private encryption key pair. Safety box unit 18 may also verify the integrity of the content decrypted from the sealed digital safety box, and send a confirmation message to sender computing device 12 when the content is valid and uncorrupted.

Sender computing device 12 and receiver computing device 16 may exchange the digital safety box and the sealed digital safety box via network 10 using any electronic communication method, such as email, multimedia messaging service (MMS), or online chat. An example of a computing device configured to operate as either sender computing device 12 or receiver computing device 16 is described in more detail below with respect to FIG. 2.

In some examples, a mobile wallet application running on sender computing device 12 may request the digital safety box from receiver computing device 16. The mobile wallet, also referred as a digital wallet, an electronic wallet, or a virtual wallet, may be implemented as a downloadable or pre-installed application or "app" that is executed by one or more processors of sender computing device 12. In one example, the mobile wallet application running on sender computing device 12 may request the digital safety box from another mobile wallet application running on receiver computing device 18. For example, the mobile wallet application on sender computing device 12 may generate a payment element to send an electronic payment to the mobile wallet application on receiver computing device 16. The techniques of this disclosure enable sender computing device 12 to send the payment element to receiver computing device 16 in a secure manner.

Although frequently described herein with reference to mobile wallet applications, the digital safety box described in this disclosure is not limited to sending and receiving financial or non-financial objects between mobile wallet applications of user devices. For example, sender computing device 12 may request a digital safety box from receiver computing device 16 of a bank or other financial institution in order to securely deposit a large amount of money. As another example, sender computing device 12 may request a digital safety box from receiver computing device 16 of a law firm or another corporate enterprise in order to securely transmit confidential documents, such as wills, deeds, contracts, or other agreements.

The disclosed techniques of the digital safety box may be used to provide temporary communication security directly between sender computing device 12 and receiver computing device 16. The disclosed digital safety box may provide enhanced security by including a unique encryption key and a unique executable code for each communication. In addition, the encryption key associated with the digital safety box may be a public key of a public and private encryption key pair in which the private key used for decryption is not be easily publicly discoverable.

Third party systems, e.g., web browsers, service providers, and certificate authorities, may be used manage digital certificates and encryption keys to provide ongoing communication security between a user and a website or web server. Using the third-party systems for secure communication requires the additional steps to become an authorized key holder with a registered public key. The techniques of this disclosure may avoid the need to use trusted third party systems for secure communications between two individual users or for one time or limited time use. The techniques may also avoid the need for two computing devices to agree on a common method, e.g., a temporary shared symmetric encryption key, to be used for secure communication, which may be susceptible to snooping or exposure.

The architecture of network system 8 illustrated in FIG. 1 is shown for exemplary purposes only and network system 8 should not be limited to this architecture. Network system 8 illustrated in FIG. 1 shows a single sender computing device 12 in communication with a single receiver computing device 16. In other examples, network system 8 may include multiple different computing devices all capable of communicating with each other. Each of the computing devices may operate as both a sender computing device and a receiver computing device based on the respective computing device's role in a given communication. In some examples, sender computing device 12 may request and receive digital safety boxes from several different receiver computing devices such that sender computing 12 may perform secure communication with each of the receiver computing devices. Conversely, receiver computing device 16 may generate and send digital safety boxes to several different sender computing devices in order to receive secure communications from each of the sender computing devices.

Figure 2:
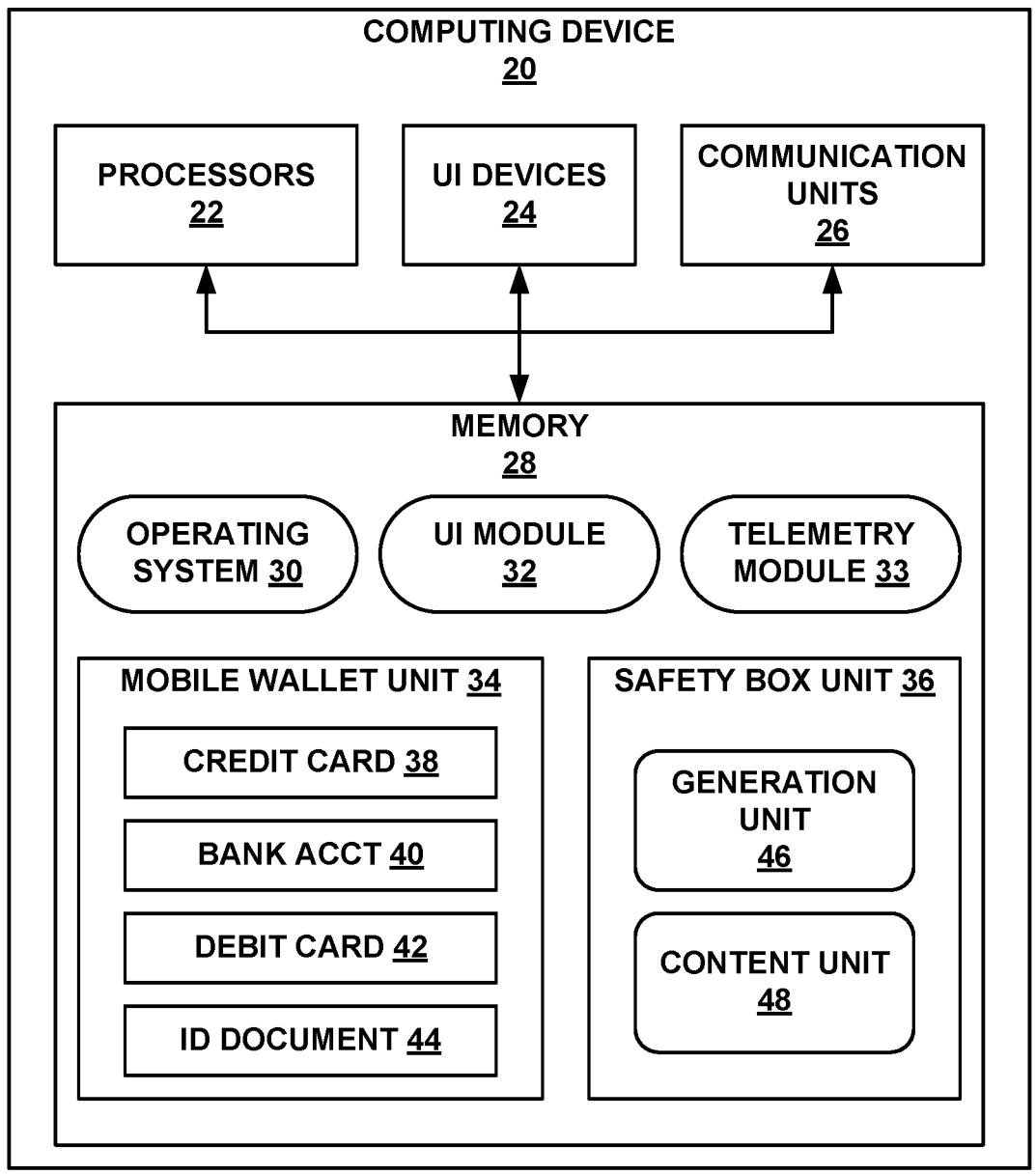
FIG. 2 is a block diagram illustrating an example computing device configured to generate and/or execute a digital safety box to provide secure communication, in accordance with the techniques of this disclosure.

FIG. 2 is a block diagram illustrating an example computing device 20 configured to generate and/or execute a digital safety box to provide secure communication, in accordance with the techniques of this disclosure. Computing device 20 may operate substantially similar to either sender computing device 12 or receiver computing device 16 from FIG. 1. For example, in some scenarios, computing device 20 may be a sender computing device that requests a digital safety box from a receiver computing device and executes the digital safety box in order to send a secure communication to the receiver computing device. In other scenarios, computing device 20 may be a receiver computing device that generates a digital safety box for a sender computing device in order to receive a secure communication from the sender computing device. The architecture of computing device 20 illustrated in FIG. 2 is shown for exemplary purposes only and computing device 20 should not be limited to this architecture. In other examples, computing device 20 may be configured in a variety of ways.

As shown in the example of FIG. 2, computing device 20 includes one or more processors 22, one or more user interface (UI) devices 24, one or more communication units 26, and one or more memory units 28. Memory 28 of computing device 20 includes operating system 30, UI module 32, telemetry module 33, mobile wallet unit 34, and safety box unit 36, which are executable by processors 22. Each of the components, units or modules of computing device 20 are coupled (physically, communicatively, and/or operatively) using communication channels for inter-component communications. In some examples, the communication channels may include a system bus, a network connection, an inter-process communication data structure, or any other method for communicating data.

Processors 22, in one example, may comprise one or more processors that are configured to implement functionality and/or process instructions for execution within computing device 20. For example, processors 22 may be capable of processing instructions stored by memory 28. Processors 22 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 28 may be configured to store information within computing device 20 during operation. Memory 28 may include a computer-readable storage medium or computer-readable storage device. In some examples, memory 28 include one or more of a short-term memory or a long-term memory. Memory 28 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 28 is used to store program instructions for execution by processors 22. Memory 28 may be used by software or applications running on computing device 20 (e.g., mobile wallet unit 34 or safety box unit 36) to temporarily store information during program execution.

Computing device 20 may utilize communication units 26 to communicate with external devices via one or more networks, e.g., network 10 from FIG. 1. Communication units 26 may be network interfaces, such as Ethernet interfaces, optical transceivers, radio frequency (RF) transceivers, or any other type of devices that can send and receive information. Other examples of interfaces may include Wi-Fi, near-field communication (NFC), or Bluetooth radios.

UI devices 24 may be configured to operate as both input devices and output devices. For example, UI devices 24 may be configured to receive tactile, audio, or visual input from a user of computing device 20. In addition to receiving input from a user, UI devices 24 may be configured to provide output to a user using tactile, audio, or video stimuli. In one example, UI devices 24 may be configured to output content such as a GUI for display at a display device. UI devices 24 may include a presence-sensitive display that displays a GUI and receives input from a user using capacitive, inductive, and/or optical detection at or near the presence sensitive display.

Other examples of UI devices 24 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 24 include a speaker, a cathode ray tube (CRT) monitor, a liquid crystal display (LCD), organic light emitting diode (OLED), or any other type of device that can generate intelligible output to a user.

Operating system 30 controls the operation of components of computing device 20. For example, operating system 30, in one example, facilitates the communication of UI module 32, telemetry module 33, mobile wallet unit 34, and safety box unit 36 with processors 22, UI devices 24, communication units 26, and memory 28. UI module 32, telemetry module 33, mobile wallet unit 34, and safety box unit 36 may each include program instructions and/or data stored in memory 28 that are executable by processors 22. For example, safety box unit 36 may include instructions that cause computing device 20 to perform one or more of the techniques described in this disclosure.

Computing device 20 may include additional components that, for clarity, are not shown in FIG. 2. For example, computing device 20 may include a battery to provide power to the components of computing device 20. Similarly, the components of computing device 20 shown in FIG. 2 may not be necessary in every example of computing device 20.

Mobile wallet unit 34 of computing device 20 may enable a user of computing device 20 to perform electronic commerce transactions, such as purchasing items and making payments. For example, mobile wallet unit 34 may store one or more user selectable virtual assets for the performance of online transactions via a website, a point of sale (POS) device at a merchant, or another external device. In one example, mobile wallet unit 34 of computing device 20 may make a payment to another mobile wallet unit executed on another computing device. In this example, mobile wallet unit 34 may create a payment element or object, such as a payment token, a proxy object, a gift card, or another payment element, to send an electronic payment to the other mobile wallet unit on the other computing device.

In the example illustrated in FIG. 2, mobile wallet unit 34 of computing device 20 includes virtual financial assets, i.e., a credit card 38, a bank account 40, and a debit card 42, and virtual non-financial assets, i.e., identification (ID) document 44. ID document 44 may comprise a driver's license, a passport, an insurance card, an employee badge, a student ID, a member card, or another ID document. In other examples, mobile wallet unit 34 may include more or fewer virtual financial assets and virtual non-financial assets. For example, mobile wallet unit 34 may include one or more additional credit accounts, banking accounts, currency accounts, or other liquid virtual assets that can be used to purchase goods and services. As another example, mobile wallet unit 34 may include one or more non-liquid virtual assets, such as virtual stock and bond certificates, virtual property titles, and virtual event tickets or other virtual documents having a monetary value. Mobile wallet unit 34 may also include one or more additional non-financial assets, such as wills, deeds, contracts, or other agreements.

In accordance with the techniques described in this disclosure, safety box unit 36 of computing device 20 may enable secure communication of data files, payments, or other content between computing device 20 and another computing device using a digital safety box. In some examples, safety box unit 36 may be executed from within mobile wallet unit 34. For example, mobile wallet unit 34 may generate a payment element for an electronic payment using one of the virtual financial assets, and execute safety box unit 36 to perform a secure communication of the payment element.

In the case where computing device 20 is operating as a receiver computing device, e.g., receiver computing device 16 from FIG. 1, processors 22 may execute safety box unit 36 to generate one or more digital safety boxes for one or more sender computing devices. For example, computing device 20 may initiate the generation of a digital safety box in response to a request received from a sender computing device. In response to the request, generation unit 46 of safety box unit 36 generates the digital safety box including an encryption key to be used by the sender computing device and an executable code that can be executed by the sender computing device. For enhanced security, the digital safety box may be one-time use and generation unit 46 may generate an encryption key and an executable code that are unique among other digital safety boxes. In this way, different digital safety boxes may operate and secure content in a different manner such that resulting respective sealed digital safety boxes for the same content may be different.

In one example, generation unit 46 may generate a public and private encryption key pair for the digital safety box, and include the public key of the key pair as the encryption key in the digital safety box. In this example, generation unit 46 may store the private key of the key pair in memory 28 of computing device 20. In this way, only computing device 20 will be able to decrypt content that was encrypted with the public key of the key pair. In other examples, generation unit 46 may generate another type of asymmetrical encryption key pair or a shared symmetrical key to be used as the encryption key of the digital safety box.

In some examples, generation unit 46 may generate the executable code of the digital safety box based on system capabilities of the sender computing device to ensure that the sender computing device will be capable of executing the executable code. For example, generation unit 46 may generate the executable code for a specific operation system of the sender computing device and to have an executable file format that is supported by the sender computing device. In one example, generation unit 46 may generate the executable code as an APK file for an Android 6 Marshmallow operating system. In another example, generation unit 46 may generate the executable code as a .exe file for a Microsoft Windows 10 operating system. Generation unit 46 may determine the system capabilities of the sender computing device from either from indications of system capabilities included in the request for the digital safety box from the sender computing device, or from a negotiation between computing device 20 and the sender computing device.

Generation unit 46 of safety box unit 36 may use ready-made executable codes for various operating systems or templates to generate the executable code of the digital safety box, but modify the code to define one or more content holders and, in some examples, define a unique data structure of a sealed digital safety box to be generated by the sender computing device. Generation unit 46 may generate the executable code to define the content holder as either a data file holder or a fillable form. In some example, generation unit 46 may generate the executable code to define a plurality of different content holders to enable the sender computing device 12 to select an appropriate one for the content to be securely communicated. In some examples, generation unit 46 may generate the executable code of the digital safety box to define a data structure of the resulting sealed digital safety box generated by the sender computing device to transmit the secure communication. For example, the defined data structure may be a cryptographic data structure that provides an extra layer of protection. In this way, only computing device 20 will be able to recognize the encrypted content within the defined data structure of the sealed digital safety box.

Generation unit 46 may also generate validation data to be included in the digital safety box that identifies computing device 20 as the safety box issuer. In some examples, the validation data may be an identifier of computing device 20 or an identifier of mobile wallet unit 34 of computing device 20. In other examples, the validation data may comprise an identifier, e.g., a personal identification number (PIN), a passcode, an image, or a phrase, associated with a user of the sender computing device. The user selected identifier may be included in the request for the digital safety box from the sender computing device or previously stored by mobile wallet unit 34 or safety box unit 36 of computing device 20. For example, when a sending device requests a digital safety box from computing device 20, the sending computing device may verify the authenticity of the digital safety box and computing device 20, as the safety box issuer, by requesting inclusion of a unique identifier generated by computing device 20 as validation data in the digital safety box.

Once generation unit 46 has generated the digital safety box, communication units 26 of computing device 20 may send the generated digital safety box to the sender computing device using any electronic communication method, such as email, MMS, or online chat. Upon receipt of a sealed digital safety box from the sender computing device, computing device 20, still operating as a receiver computing device, executes safety box unit 36 to unpack the sealed digital safety box and decrypt the encrypted content included in the sealed digital safety box. In some examples, the received sealed digital safety box may have the unique cryptographic data structure that was originally defined by the executable code of the digital safety box. Content unit 48 of safety box unit 36 may perform a first "decryption" step of recognizing the encrypted content within the cryptographic data structure of the sealed digital safety box. Content unit 48 may then perform a second decryption step of decrypting the encrypted content from the sealed digital safety box with a decryption key, e.g., the private key of the key pair stored in memory 28.

In some examples, content unit 48 may verify the integrity of the decrypted content from the sealed digital safety box. If the decrypted content is uncorrupted, communication units 26 of computing device 20 may send a confirmation message to the sender computing device. In some cases, if the decrypted content is corrupted or if the sealed digital safety box cannot be opened, communication units 26 of computing device 20 may send an alert to the sender computing device.

In the case where computing device 20 comprises a sender computing device, e.g., sender computing device 12 from FIG. 1, processors 22 may execute the executable code of a received digital safety box as safety box unit 36. Processors 22 may then execute content unit 48 of safety box unit 36 to store content in a defined content holder of the digital safety box, encapsulate the content with the encryption key of the digital safety box, and generate a sealed digital safety box including the encrypted content.

Computing device 20 may originally request the digital safety box from a receiver computing device in order to send a confidential document or an electronic payment to the receiver computing device in a secure manner. In one example, mobile wallet unit 34 may generate the request for the digital safety box in order to perform a secure communication of a payment element for an electronic payment using one of the virtual financial assets included in mobile wallet unit 34. In some examples, the request for the digital safety box may include indications of system capabilities or preferences of computing device 20 to enable the receiver computing device to generate a digital safety box that can be executed by computing device 20. In other examples, after the request for the digital safety box is received by the receiver computing device, computing device 20 may participate in a negotiation, e.g., a series of communications, with the receiver computing device regarding each other's system capabilities.

Upon receipt of the requested digital safety box, processors 22 of computing device 20 execute the executable code of the digital safety box as safety box unit 36. Content unit 48 of safety box unit 36 then presents a content holder defined by the executable code to a user of computing device 20 via UI devices 24. The presented content holder may comprise a data file holder, a fillable form, or another type of content holder selected by content unit 48 from a plurality of content holders defined by the executable code. In some cases, content unit 48 may comprise a rule engine configured to select an appropriate content holder based on system capabilities of computing device 20 and the type of content to be stored in the content holder. Content unit 48 may then store whatever content is inserted or placed into the content holder by the user of computing device 20 via UI devices 24. An example user interface of the digital safety box is described in more detail below with respect to FIG. 3.

Once the content is stored in the content holder, content unit 48 of safety box unit 36 encrypts the content in the content holder with the encryption key of the digital safety box. In some examples, the encryption key may be a public key of a private and public encryption key pair generated by the receiver computing device that issued the digital safety box. In this way, only the receiver computing device that has the private key will be able to decrypt the content in the content holder that was encrypted with the public key of the key pair.

Generation unit 46 of safety box unit 36 may then generate a sealed digital safety box including the encrypted content. In some examples, generation unit 46 may generate the sealed digital safety box to have a data structure defined by the executable code of the digital safety box. For example, the defined data structure may be a cryptographic data structure that provides an extra layer of protection, e.g., in that the data structure must be recognized and/or decoded prior to the enclosed data being read and/or utilized. In this way, only the receiver computing device that issued the digital safety box will be able to recognize the encrypted content within the cryptographic data structure of the sealed digital safety box. In some scenarios, the cryptographic data structure may be viewed as another form of encryption for the content. Generation unit 46 may also generate validation data to be included in the sealed digital safety box that identifies computing device 20 as the safety box sender. The validation data may be an identifier of computing device 20 or an identifier of mobile wallet unit 34 of computing device 20. In other examples, the validation data may comprise an identifier, e.g., a PIN, a passcode, an image, or a phrase, associated with a user of computing device 20.

Once generation unit 46 has generated the sealed digital safety box, communication units 26 of computing device 20 may send the sealed digital safety box to the receiver computing device using any electronic communication method, such as email, MMS, or online chat.

After transmission of the sealed digital safety box, computing device 20, still operating as the sender computing device, may receive a confirmation message from the receiver computing device. The confirmation message may indicate that the receiver computing device was able to open the sealed digital safety box and/or that the decrypted content included in the sealed digital safety box is valid and uncorrupted. In the case where the decrypted content is corrupted or the sealed digital safety box cannot be opened by the receiver computing device, computing device 20 may receive an alert from the receiver computing device. In other cases, if computing device 20 does not receive a confirmation message from the receiver computing device within a preset time period after sending the sealed digital safety box, communication units 26 of computing device 20 may send a follow-up message to the receiver computing device. In any case, if computing device 20 does not receive a confirmation message from the receiver computing device, communication units 26 of computing device 20 may resend the sealed digital safety box.

Figure 3:
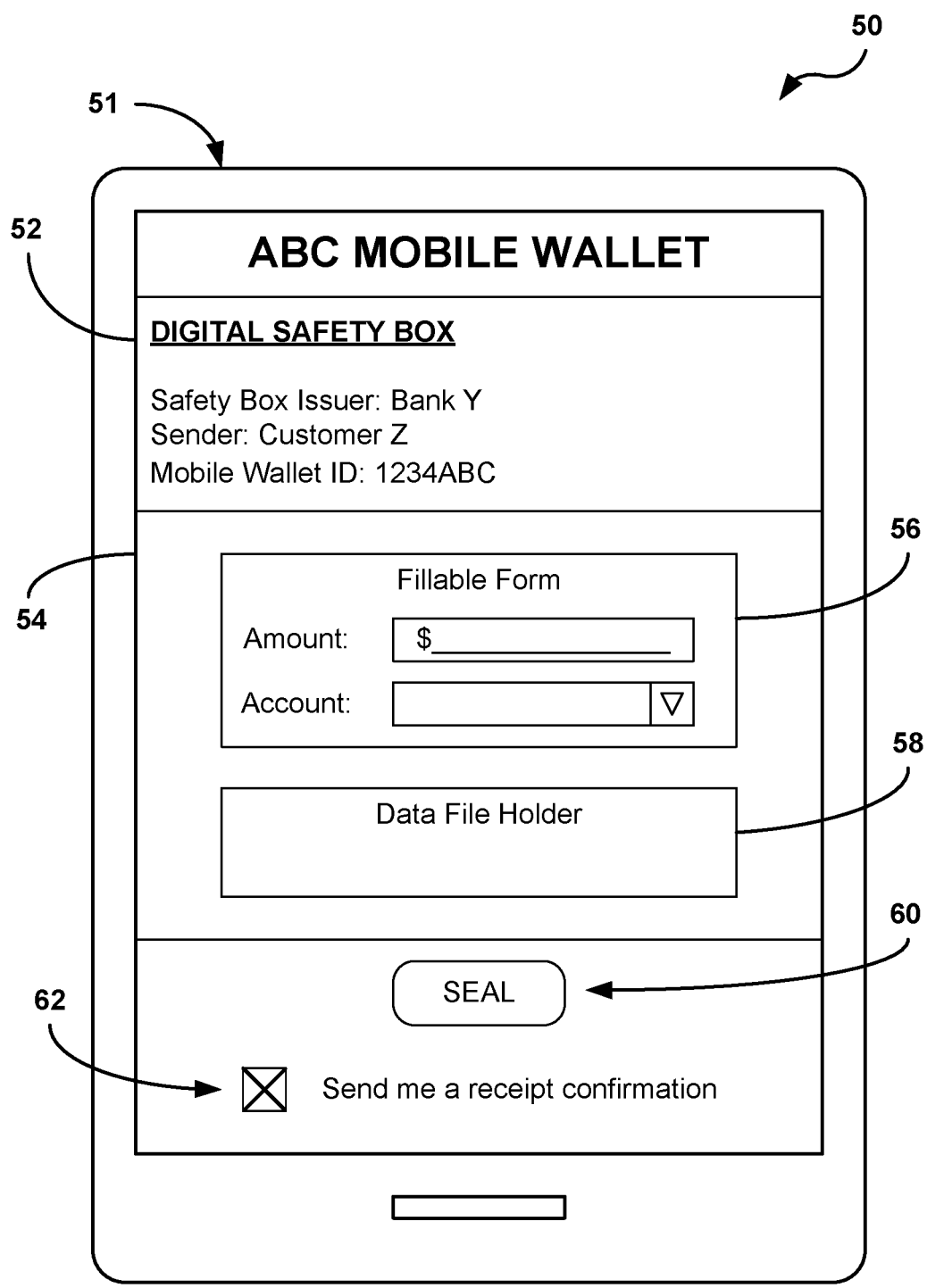
FIG. 3 is a conceptual diagram illustrating an example user interface of a digital safety box executed on a sender computing device, in accordance with the techniques of this disclosure.

FIG. 3 is a conceptual diagram illustrating an example user interface 50 of a digital safety box executed on a sender computing device 51, in accordance with the techniques of this disclosure. In some instances, sender computing device 51 may be configured similarly to or the same as computing device 20 shown in FIG. 2. In the example illustrated in FIG. 3, sender computing device 51 comprises a smart phone and user interface 50 comprises a GUI presented on a presence-sensitive display (i.e., a touch screen) of sender computing device 51. In other examples, user interface 50 may be presented on a touch screen of a tablet computer or other user device. In still other examples, user interface 50 may be presented on a monitor or other display device of a laptop or desktop computer and a user may interact with user interface 50 using an external user interface device such as a mouse or keyboard.

When sender computing device 51 receives a requested digital safety box from a receiver computing device, sender computing device 51 may execute the executable code included in the digital safety box as a safety box application, e.g., safety box unit 36 of computing device 20 from FIG. 2. In some examples, sender computing device 51 may execute the safety box application from within a mobile wallet application, e.g., mobile wallet unit 34 of computing device 20 from FIG. 2. In the example illustrated in FIG. 3, user interface 50 comprises a user interface of a digital safety box executed within a mobile wallet application. For example, user interface 50 of the digital safety box includes a header "ABC Mobile Wallet." In this example, sender computing device 51 may use the digital safety box to securely transfer a payment using a financial asset included in the mobile wallet or to securely send a document associated with a non-financial asset included in the mobile wallet.

As illustrated in FIG. 3, user interface 50 includes an identification section 52 and a container section 54. Identification section 52 of user interface 50 may present identification information of the sending and receiving parties of the digital safety box. In the illustrated example, identification section 52 presents a name of the safety box issuer, "Bank Y," a name of the content sender, "Customer Z," and a mobile wallet identifier, "1234ABC."

Container section 54 of user interface 50 presents the content holder defined by the executable code of the digital safety box. In the illustrated example, container section 54 includes a fillable form 56 that the user of sender computing device 51 may fill out with information regarding content to be securely transmitted to the safety box issuer. In the case of a secure payment, fillable form 56 may include a place for the user to enter a payment amount, and a place for the user to enter or select (e.g., from a drop down menu) an account or other financial asset within the mobile wallet from which to transfer the payment to the safety box issuer. In addition, in the illustrated example, container section 54 includes a data file holder 58 where the user of sender computing device 51 may select, insert, or "drag and drop" data files, e.g., checks, loan agreements, or other financial or non-financial documents, to be securely transmitted to the safety box issuer.

Once the content is stored within the content holder presented in container section 54, the user may select the "SEAL" button 60 of user interface 50 to indicate that the content is ready to send to the safety box issuer. For example, selecting button 60 may trigger the safety box application running on sender computing device 51 to "seal" the digital safety box by encrypting the stored content within the content holder with the provided encryption key, and generating a sealed digital safety box including the encrypted content. Prior to sealing the digital safety box, the user of sender computing device 51 may check box 62 to request to receive a confirmation of receipt of the sealed digital safety box from the safety box issuer.

Sender computing device 51 may then send the sealed digital safety box to the safety box issuer, "Bank Y," via any electronic communication method, such as email, MMS, or online chat. In some examples, once the sealed digital safety box is generated including the encrypted content, sender computing device 51 automatically sends the sealed digital safety box to the safety box issuer. In other examples, after generating the sealed digital safety box, sender computing device 51 may present another user interface to the user requesting a final review and approval of the sealed digital safety box before sending to the safety box issuer.

In one example, the safety box application running on sender computing device 51 may generate the sealed digital safety box to have a unique cryptographic data structure defined by the executable code of the received digital safety box. In this example, only the safety box issuer may understand the data structure and recognize the encrypted content within the data structure of the sealed digital safety box. Unlike the digital safety box generated by the safety box issuer, the sealed digital safety box generated by sender computing device 51 may not include the encryption key or any executable code. Example structures of a digital safety box and a sealed digital safety box are described below with respect to FIGS. 4 and 5.

Figure 4:
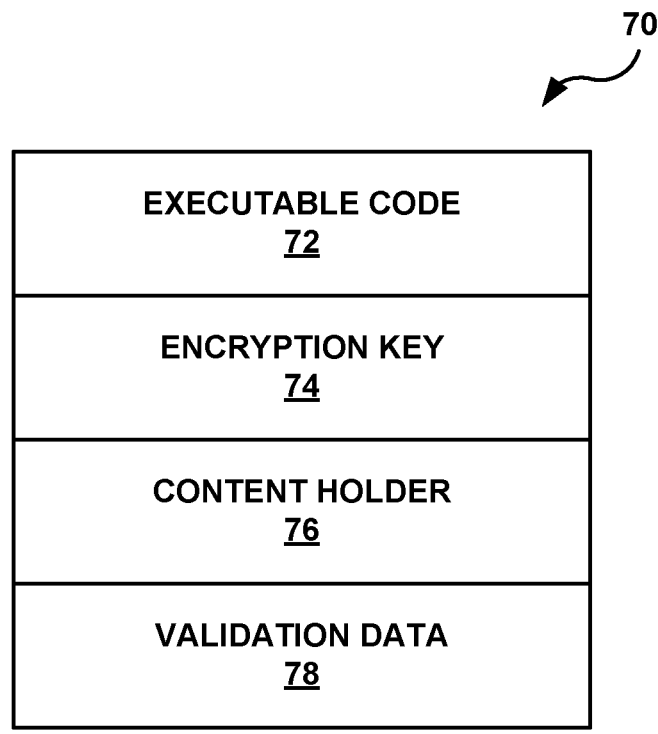
FIG. 4 is a conceptual diagram illustrating an example structure of a digital safety box, in accordance with the techniques of this disclosure.

FIG. 4 is a conceptual diagram illustrating an example structure of a digital safety box 70, in accordance with the techniques of this disclosure. Digital safety box 70 may be generated by a receiver computing device, e.g., receiver computing device 16 from FIG. 1, and used by a sender computing device, e.g., sender computing device 12 from FIG. 1, to provide secure communication between the two devices. In the example of FIG. 4, the digital safety box 70 includes an executable code 72, an encryption key 74, a content holder 76 defined by executable code 72, and validation data 78. The executable code 72 may be executed by a sender computing device to store content within content holder 76 and encrypt the content stored in content holder 76 with encryption key 74.

Executable code 72, when executed by the sender computing device, may define content holder 76 to be a data file holder configured to accept data objects, such as documents, or a fillable form configured to accept information, such as payment account information. In some examples, executable code 72 may define a plurality of different content holders such that the sender computing device may select an appropriate one of the defined content holders as content holder 76. In addition, executable code 72 may define a data structure of a sealed digital safety box, which is generated by the sender computing device upon encrypting the content stored in content holder 76. For example, executable code 72 may define the data structure of the sealed digital safety box such that only the receiver computing device will be able to understand the data structure and recognize the encrypted content within the data structure.

Encryption key 74 may comprise a public key of a public and private encryption key pair. For example, receiver computing device may generate the public and private encryption key pair in response to a request for digital safety box 70 from the sender computing device. The receiver computing device includes the public key of the encryption key pair as encryption key 74 in digital safety box 70 to be used by the sender computing device to encrypt content for secure communication. The receiver computing device may store the private key of the encryption key pair for later use to decrypt content within a sealed digital safety box that was encrypted with encryption key 74. In other examples, encryption key 74 may comprise one key in another type of asymmetrical encryption key pair generated by the receiver computing device. In still other examples, encryption key 74 may comprise a shared symmetrical key generated by the receiver computing device.

Validation data 78 may comprise information that at least identifies the receiver computing device that generated digital safety box 70. For example, the sender computing device may use validation data 78 to determine that digital safety box 70 was generated by the same receiver computing device from which it was requested by the sender computing device. In some examples, validation data 78 may also identify the sender computing device that requested digital safety box 70 for secure communication.

In one example, the sender computing device may specify a personal identification number (PIN) associated with a user of the sender computing device in its request for digital safety box 70 sent to the receiver computing device. In this example, the receiver computing device may include the PIN as validation data 78 within digital safety box 70, and the sender computing device may enter the PIN in order to execute the executable code 72 of digital safety box 70. By using the sender-specified PIN as validation data 78, the sender computing device may verify that the receiver computing device is a legitimate receiver from which the safety box was requested. In addition, by using the sender-specified PIN as validation data 78, the sender computing device may verify that the received digital safety box 70 is the safety box requested by the sender computing device.

In another example, the user of the sender computing device may preselect or preset a passcode, an image, a phrase, or the like via a mobile wallet application or a safety box application for use as verification data 78 in a future digital safety box 70. In other examples, validation data 78 may hold other information such as a mobile wallet identifier of the sender computing device and/or a receiver computing device identifier. In still other examples, validation data 78 may including location information for one or both of the sender computing device and the receiver computing device.

Figure 5:
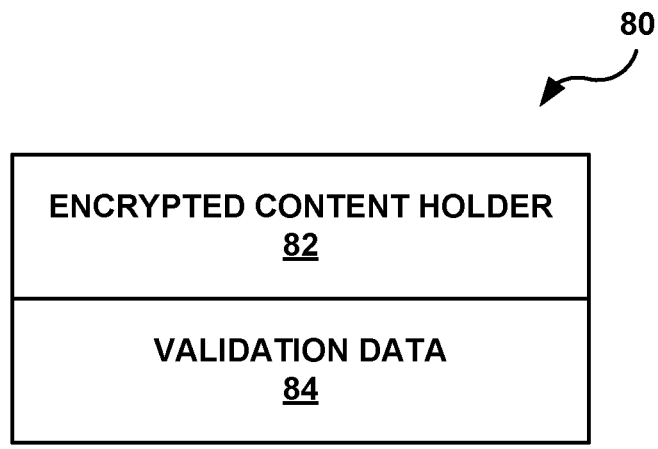
FIG. 5 is a conceptual diagram illustrating an example structure of a sealed digital safety box, in accordance with the techniques of this disclosure.

FIG. 5 is a conceptual diagram illustrating an example structure of a sealed digital safety box 80, in accordance with the techniques of this disclosure. Sealed digital safety box 80 may be generated by a sender computing device, e.g., sender computing device 12 from FIG. 1, for transmission to a receiver computing device, e.g., receiver computing device 16 from FIG. 1, in a secure communication between the two devices. In the example of FIG. 5, the sealed digital safety box 80 includes an encrypted content holder 82 and validation data 84.

Sealed digital safety box 80 may be generated by the sender computing device in accordance with a digital safety box, e.g., digital safety box 70 from FIG. 4, received from the receiver computing device. For example, the sender computing device may store content within content holder 76 of digital safety box 70, and encrypt the content stored in content holder 76 with encryption key 74 included in digital safety box 70. The sender computing device may then generate sealed digital safety box 80 as an encrypted file including encrypted content holder 82. In some examples, sealed digital safety box 80 may have a data structure defined by executable code 72 of digital safety box 70. For example, sealed digital safety box 80 may have a unique cryptographic data structure such that only the receiver computing device will be able to understand the data structure and recognize encrypted content holder 82 within the data structure.

Validation data 84 may comprise information that at least identifies the sender computing device that generated sealed digital safety box 80. For example, the receiver computing device may use validation data 84 to determine that sealed digital safety box 80 was generated by the same sender computing device that requested the digital safety box 70 for secure communication. In some examples, validation data 84 may also identify the receiver computing device that generated digital safety box 70. Validation data 84 may generally comprise any of the examples described above with respect to validation data 78 of digital safety box 70.

Figure 6:
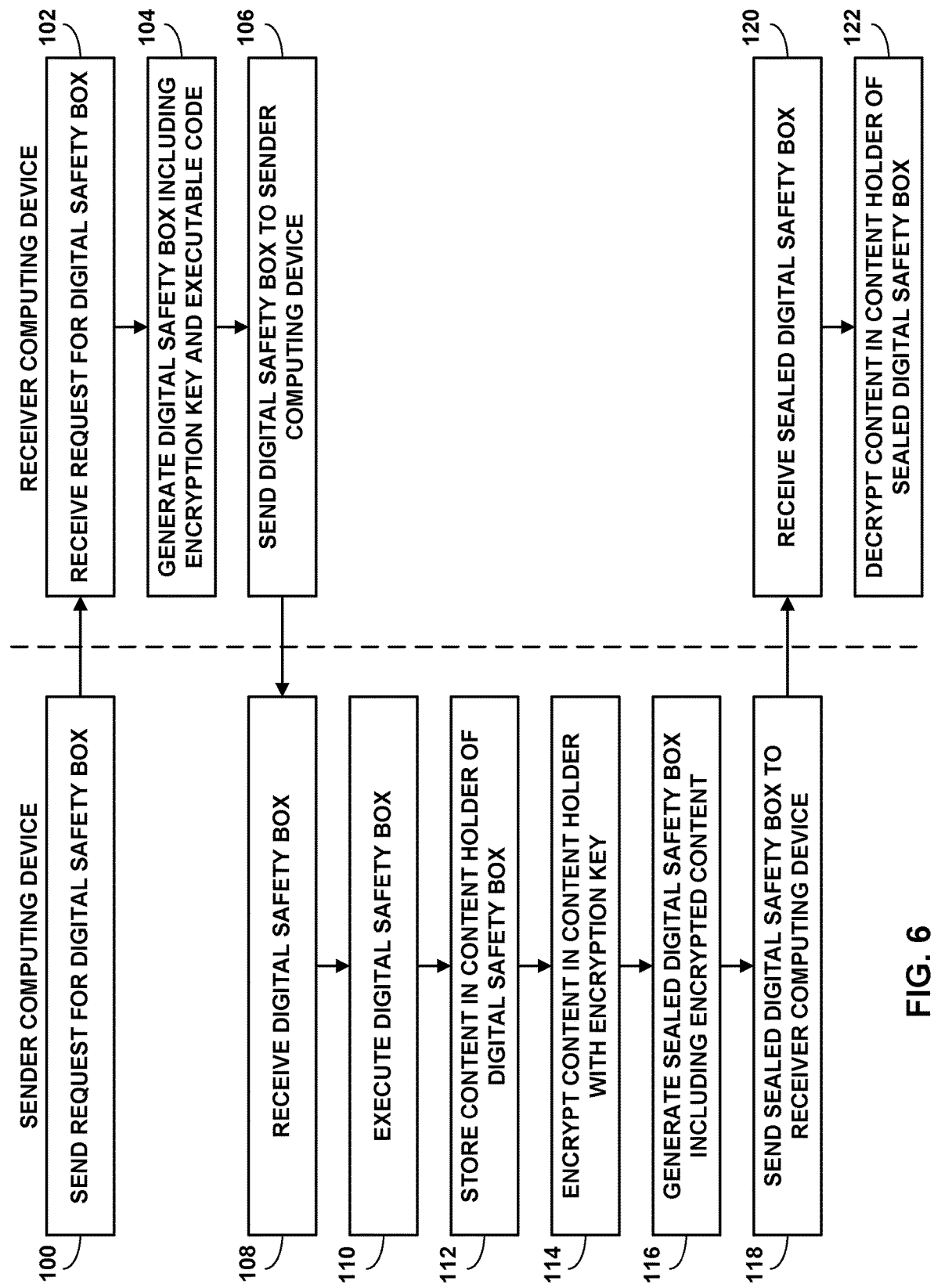
FIG. 6 is a flowchart illustrating an example operation of a sender computing device and a receiver computing device providing secure communication using a digital safety box, in accordance with the techniques of this disclosure.

FIG. 6 is a flowchart illustrating an example operation of a sender computing device and a receiver computing device providing secure communication using a digital safety box, in accordance with the techniques of this disclosure. The example operation of FIG. 6 is described with respect to sender computing device 12 and receiver computing device 16 from FIG. 1, each of which may operate substantially similar to computing device 20 from FIG. 2.

Sender computing device 12 sends a request for a digital safety box to receiver computing device 16 (100). The request for the digital safety box may be sent using any electronic communication method, such as email, MMS, or online chat. In one example, sender computing device 12 may request the digital safety box from receiver computing device 16 in order to send a confidential document or other communication, e.g., a legal agreement or contract, to receiver computing device 16. In another example, sender computing device 12 may request the digital safety box from receiver computing device 16 in order to send a payment via a mobile wallet application executing on sender computing device 12 to receiver computing device 16.

In some examples, the request for the digital safety box may include indications of system capabilities or preferences of sender computing device 12. The indicated system capabilities may include the operating system of sender computing device 12 and one or more executable file formats supported by sender computing device 12. The one or more executable file formats may include a preferred executable file format of sender computing device 12 or a list of all executable file formats supported by sender computing device 12. The indicated system capabilities may also include processing speed, memory types and sizes, display types, user interface devices, and the like.

Receiver computing device 16 receives the request for the digital safety box from sender computing device 12 (102). In response to the request, receiver computing device 16 generates the digital safety box for sender computing device 12, the digital safety box including an encryption key and an executable code that defines a content holder (104). In some examples, receiver computing device 16 may generate a one-time use digital safety box that includes a unique encryption key and a unique executable code.

In some examples, the encryption key included in the digital safety box may comprise a public key of an encryption key pair. In response to the request for the digital safety box, receiver computing device 16 may generate the encryption key pair that includes the public key and a private key. Receiver computing device 16 may include the public key of the encryption key pair in the digital safety box to be used by sender computing device 12 to encrypt content for secure communication. Receiver computing device 16 may store the private key of the encryption key pair for later use to decrypt content that was encrypted with the public key of the encryption key pair.

In some examples, receiver computing device 16 may first determine the system capabilities or preferences of sender computing device 12, and then generate the executable code of the digital safety box based on the determined system capabilities. In this way, receiver computing device 16 may ensure that sender computing device 12 is capable of recognizing the digital safety box and executing the executable code of the digital safety box. In one example, receiver computing device 16 may determine the system capabilities from indications included in the request for the digital safety box received from sender computing device 12. In this example, receiver computing device 16 may accept the system capabilities indicated in the request, and generate the digital safety box to operate in accordance with the system capabilities. In another example, receiver computing device 16 may determine the system capabilities from a negotiation between receiver computing device 16 and sender computing device 12. In this example, receiver computing device 16 and sender computing device 12 exchange several messages during which receiver computing device 16 may select one of the executable file formats supported by both sender computing device 12 and receiver computing device 16.

In addition, the executable code included in the digital safety box may define the content holder as either a data file holder or a fillable form. In some examples, the executable code of the digital safety box may define a plurality of different content holders from which sender computing device 12 may select an appropriate one for the content to be securely communicated. In some examples, the executable code of the digital safety box may also define a data structure of a sealed digital safety box generated by sender computing device 12 to carry encrypted content. In additional examples, the digital safety box may include validation data that identifies receiver computing device 16. Upon generating the digital safety box as described above, receiver computing device 16 sends the digital safety box to sender computing device 12 using any electronic communication method (106).

Sender computing device 12 receives the digital safety box including the encryption key and the executable code from receiver computing device 16 using any electronic communication method (108). In some examples, sender computing device 12 may first verify an identity of receiver computing device 16 based on validation data included in the digital safety box. In this way, sender computing device 12 may verify that the digital safety box is received from the same computing device from which the digital safety box was requested.

Upon receiving the digital safety box, sender computing device 12 executes the executable code of the digital safety box (110). As described above, the digital safety box may be specifically generated to operate in accordance with the system capabilities and preferences of sender computing device 12. Executing the executable code may be comparable to executing an application or "app" on sender computing device 12. Upon executing the executable code, sender computing device 12 may present the content holder defined by the executable code to a user of sender computing device 12 via a user interface, e.g., user interface 50 from FIG. 3. In some examples, the executable code of the digital safety box may define a plurality of different content holders. Sender computing device 12 may then select an appropriate content holder from the plurality of content holders for the content to be securely communicated.

Sender computing device 12 then stores content in the content holder of the digital safety box (112). As one example, in the case where the content holder is a data file holder, the user of sender computing device 12 may insert a link to or "drag and drop" a data file, e.g., a document, into the data file holder via the user interface. As another example, in the case where the content holder is a fillable form, the user of sender computing device 12 may type or otherwise insert information, e.g., banking information and monetary amounts for a payment, into the fillable form via the user interface.

Once the content is stored in the content holder, sender computing device 12 encrypts the content in the content holder with the encryption key of the digital safety box (114). In some cases, the content encryption may occur in response to an indication that the user of sender computing device 12 has included all the content in the content holder. For example, the user of sender computing device 12 may select an option via the user interface to "seal" the digital safety box. Sender computing device 12 then generates a sealed digital safety box including the encrypted content (116). In some examples, the sealed digital safety box may have a data structure defined by the executable code of the digital safety box. For example, the defined data structure may be a cryptographic data structure that provides an extra layer of protection. In this way, the sealed digital safety box may have a cryptographic data structure that only receiver computing device 16 may recognize. In some scenarios, the cryptographic data structure may be viewed as another form of encryption for the content. In additional examples, the sealed digital safety box may include validation data that identifies sender computing device 12. Sender computing device 12 sends the sealed digital safety box to receiver computing device 16 using any electronic communication method (118).

Receiver computing device 16 receives the sealed digital safety box including the encrypted content from sender computing device 12 using any electronic communication method (120). In some examples, receiver computing device 16 may first verify an identity of sender computing device 12 based on validation data included in the sealed digital safety box. In this way, receiver computing device 16 may verify that the sealed digital safety box is received from the same computing device that requested the digital safety box.

Receiver computing device 16 decrypts the content in the content holder of the sealed digital safety box (122). Receiver computing device 16 may decrypt the encrypted content in the content holder of the sealed digital safety box with the private key of the encryption key pair. In some examples, as described above, the received sealed digital safety box may have the unique cryptographic data structure that was originally defined by the executable code of the digital safety box generated by receiver computing device 16. Receiver computing device 16 may then perform a first "decryption" step of recognizing the encrypted content within the cryptographic data structure of the sealed digital safety box.

In some examples, receiver computing device 16 may verify the integrity of the decrypted content from the sealed digital safety box. If the decrypted content is uncorrupted, receiver computing device 16 may send a confirmation message to sender computing device 12. In some cases, if the decrypted content is corrupted or if the sealed digital safety box cannot be opened, receiver computing device 16 may send an alert to sender computing device 12. Sender computing device 12 may then resend the sealed digital safety box, or determine that an illegitimate receiver is attempting to open the sealed digital safety box. In other cases, if sender computing device 12 does not receive a confirmation message within a preset time period after sending the sealed digital safety box, sender computing device 12 may send a follow-up message to receiver computing device 16. If receiver computing device 16 receives such a follow-up message but did not receive the sealed digital safety box, receiver computing device 16 may determine that the sealed digital safety box was intercepted. In any case, sender computing device 12 and/or receiver computing device 16 may quickly determine that the sealed digital safety box has been intercepted and may take appropriate action, e.g., freezing user accounts or alerting the authorities.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a wearable computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for secure communication, the method comprising:
   receiving, by a receiver computing device and from a sender computing device, a request for a digital safety box;
   generating, by the receiver computing device, the digital safety box for the sender computing device, wherein the digital safety box includes an encryption key and an executable code that defines a content holder as a content file structure, and wherein the executable code is configured to perform encryption of content held in the content holder with the encryption key upon execution;
   sending, by the receiver computing device and to the sender computing device, the digital safety box;
   receiving, by the receiver computing device and from the sender computing device, a sealed digital safety box including the content in the content holder encrypted with the encryption key; and
   decrypting, by the receiver computing device, the content in the content holder of the sealed digital safety box.

2. The method of claim 1, wherein the executable code of the digital safety box defines a data structure of the sealed digital safety box,
   wherein receiving the sealed digital safety box comprises receiving the sealed digital safety box having the defined data structure, and
   wherein decrypting the content comprises recognizing the encrypted content within the defined data structure of the sealed digital safety box prior to decrypting the encrypted content with a decryption key.

3. The method of claim 1, further comprising generating an encryption key pair that includes a public key and a private key, wherein the encryption key included in the digital safety box comprises the public key of the encryption key pair, and wherein decrypting the content comprises decrypting the content in the content holder of the sealed digital safety box with the private key of the encryption key pair.

4. The method of claim 1, further comprising determining, by the receiver computing device, system capabilities of the sender computing device, wherein generating the digital safety box comprises generating the executable code based on the determined system capabilities of the sender computing device.

5. The method of claim 1, wherein the digital safety box comprises a first digital safety box for the sender computing device, the method further comprising:
   receiving, from the sender computing device, a request for a second digital safety box; and
   generating the second digital safety box for the sender computing device, wherein the second digital safety box includes a different encryption key than the first digital safety box and a different executable code than the first digital safety box.

6. The method of claim 1, wherein the executable code of the digital safety box defines a plurality of content holders as different content file structures, wherein the different content file structures include at least one of a data file holder or a fillable form.

7. The method of claim 1, wherein the digital safety box includes validation data that identifies the receiver computing device, the method further comprising verifying an identity of the sender computing device based on other validation data included in the sealed digital safety box.

8. The method of claim 1, further comprising:
verifying integrity of the decrypted content from the sealed digital safety box; and
in response to verifying the integrity of the decrypted content, sending a confirmation message to the sender computing device.

9. A receiver computing device comprising:
a memory; and
one or more processors in communication with the memory and configured to:
receive, from a sender computing device, a request for a digital safety box;
generate the digital safety box for the sender computing device, wherein the digital safety box includes an encryption key and an executable code that defines a content holder as a content file structure, and wherein the executable code is configured to perform encryption of content held in the content holder with the encryption key upon execution;
send, to the sender computing device, the digital safety box;
receive, from the sender computing device, a sealed digital safety box including the content in the content holder encrypted with the encryption key; and
decrypt the content in the content holder of the sealed digital safety box.

10. The receiver computing device of claim 9, wherein the executable code of the digital safety box defines a data structure of the sealed digital safety box, and wherein the one or more processors are configured to:
receive the sealed digital safety box having the defined data structure; and
to decrypt the content, recognize the content in the content holder within the defined data structure of the sealed digital safety box prior to decrypting the encrypted content with a decryption key.

11. The receiver computing device of claim 9, wherein the one or more processors are configured to generate an encryption key pair that includes a public key and a private key, wherein the encryption key included in the digital safety box comprises the public key of the encryption key pair, and wherein the one or more processors are configured to decrypt the content in the content holder of the sealed digital safety box with the private key of the encryption key pair.

12. The receiver computing device of claim 9, wherein the one or more processors are configured to determine system capabilities of the sender computing device, and generate the executable code based on the determined system capabilities of the sender computing device.

13. The receiver computing device of claim 9, wherein the digital safety box comprises a first digital safety box for the sender computing device, and wherein the one or more processors are configured to:
receive, from the sender computing device, a request for a second digital safety box; and
generate the second digital safety box for the sender computing device, wherein the second digital safety box includes a different encryption key than the first digital safety box and a different executable code than the first digital safety box.

14. The receiver computing device of claim 9, wherein the executable code of the digital safety box defines a plurality of content holders as different content file structures, wherein the different content file structures include at least one of a data file holder or a fillable form.

15. The receiver computing device of claim 9, wherein the digital safety box includes validation data that identifies the receiver computing device, and wherein the one or more processors are configured to verify an identity of the sender computing device based on other validation data included in the sealed digital safety box.

16. The receiver computing device of claim 9, wherein the one or more processors are configured to:
verify integrity of the decrypted content from the sealed digital safety box; and
in response to verifying the integrity of the decrypted content, send a confirmation message to the sender computing device.

17. A method for secure communication, the method comprising:
sending, by a sender computing device and to a receiver computing device, a request for a digital safety box;
receiving, by the sender computing device and from the receiver computing device, the digital safety box including an encryption key and an executable code that defines a content holder as a content file structure;
executing, by the sender computing device, the executable code of the digital safety box, wherein executing the executable code includes storing content in the content holder, encrypting the content held in the content holder with the encryption key, and generating a sealed digital safety box including the encrypted content; and
sending, by the sender computing device and to the receiver computing device, the sealed digital safety box.

18. The method of claim 17, wherein the executable code defines a data structure of the sealed digital safety box, and wherein generating the sealed digital safety box comprises generating the sealed digital safety box having the defined data structure.

19. The method of claim 17, wherein the digital safety box comprises a first digital safety box for the sender computing device, the method further comprising receiving, from the receiver computing device, a second digital safety box including a different encryption key than the first digital safety box and a different executable code than the first digital safety box.

20. The method of claim 17, wherein the executable code defines a plurality of content holders as different content file structures, wherein the different content file structures include at least one of a data file holder or a fillable form, and wherein executing the executable code of the digital safety box includes selecting the content holder from the plurality of content holders.

21. The method of claim 17, further comprising verifying an identity of the receiver computing device based on validation data included in the digital safety box, and wherein the sealed digital safety box includes other validation data that identifies the sender computing device.

22. The method of claim 17, further comprising, in response to sending the sealed digital safety box, receiving a confirmation message from the receiver computing device.

23. A sender computing device comprising:
a memory; and
one or more processors in communication with the memory and configured to:
send, to a receiver computing device, a request for a digital safety box;

receive, from the receiver computing device, the digital safety box including an encryption key and an executable code that defines a content holder as a content file structure;

execute the executable code of the digital safety box, wherein the executable code causes the one or more processors to store content in the content holder, encrypt the content held in the content holder with the encryption key, and generate a sealed digital safety box including the encrypted content; and send, to the receiver computing device, the sealed digital safety box.

24. The sender computing device of claim 23, wherein the executable code defines a data structure of the sealed digital safety box, and wherein the executable code causes the one or more processors to generate the sealed digital safety box having the defined data structure.

25. The sender computing device of claim 23, wherein the digital safety box comprises a first digital safety box for the sender computing device, and wherein the one or more processors are configured to receive, from the receiver computing device, a second digital safety box including a different encryption key than the first digital safety box and a different executable code than the first digital safety box.

26. The sender computing device of claim 23, wherein the executable code defines a plurality of content holders as different content file structures, wherein the different content file structures include at least one of a data file holder or a fillable form, and wherein the executable code causes the one or more processors to select the content holder from the plurality of content holders.

27. The sender computing device of claim 23, wherein the one or more processors are configured to verify an identity of the receiver computing device based on validation data included in the digital safety box, and wherein the sealed digital safety box includes other validation data that identifies the sender computing device.

28. The sender computing device of claim 23, wherein the one or more processors are configured to, in response to sending the sealed digital safety box, receive a confirmation message from the receiver computing device.

* * * * *